United States Patent [19]

Holcombe

[11] 3,861,072

[45] Jan. 21, 1975

[54] LUMINESCENT FISHING LURE

[76] Inventor: Gordon B. Holcombe, 603 Santa Barbara Ave., Millbrae, Calif. 94030

[22] Filed: May 29, 1973

[21] Appl. No.: 364,748

[52] U.S. Cl. ................................ 43/17.6, 240/2.25
[51] Int. Cl. .............................................. A01k 85/00
[58] Field of Search ..................... 43/17.6, 17.5, 17; 250/458, 462, 483, 485, 486; 240/2.25, 6.4 F

[56] References Cited
UNITED STATES PATENTS

| | | | |
|---|---|---|---|
| 1,422,841 | 7/1922 | Dey................................ | 43/17.6 X |
| 2,303,097 | 11/1942 | Townsend et al................ | 43/17.6 X |
| 3,091,881 | 6/1963 | Evans............................... | 43/17 |
| 3,535,812 | 10/1970 | Crecelius......................... | 43/17.6 |
| 3,576,987 | 5/1971 | Voight et al..................... | 43/17.6 UX |
| 3,708,903 | 1/1973 | Bercz et al....................... | 43/17.6 |

FOREIGN PATENTS OR APPLICATIONS 640,967   6/1962   Italy..................................... 43/17.6

Primary Examiner—Robert Peshock
Assistant Examiner—Daniel J. Leach
Attorney, Agent, or Firm—Limbach, Limbach & Sutton

[57] ABSTRACT

An illuminated fishing lure for attracting fish, squid and other aquatic life, the lure being formed by a chemiluminescent wand having an outer adjustable opaque sheath for regulating the degree of illumination of the submerged lure. The wand has a first chemical in an inner frangible tube disposed within an outer flexible casing containing a second chemical. When the outer casing is deformed the inner tube is fractured and the chemicals mix to generate a chemiluminescence.

8 Claims, 6 Drawing Figures

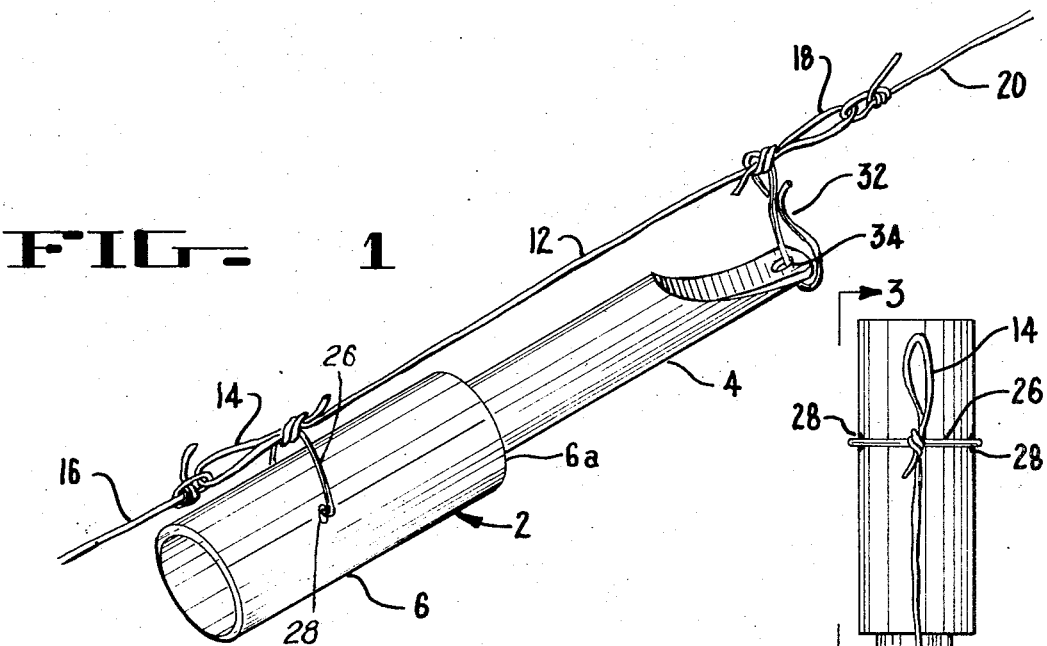
FIG. 1
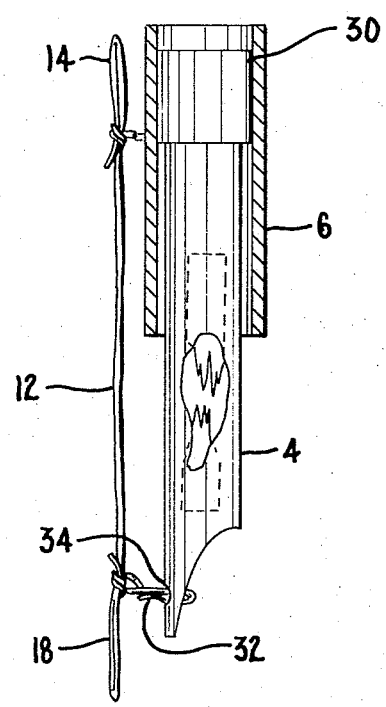
FIG. 2
FIG. 3

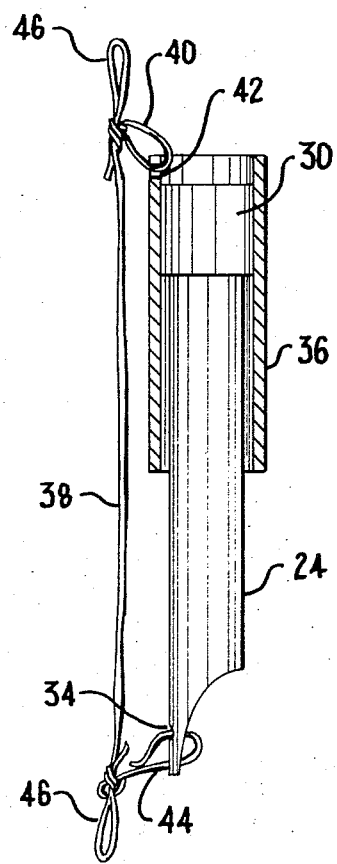
FIG_4
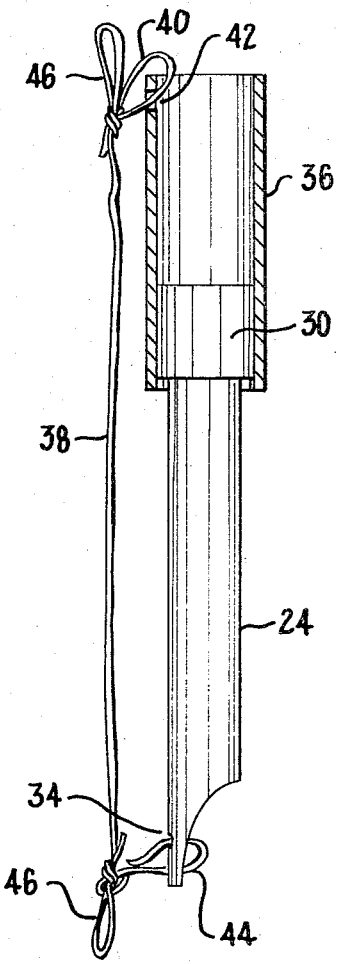
FIG_5
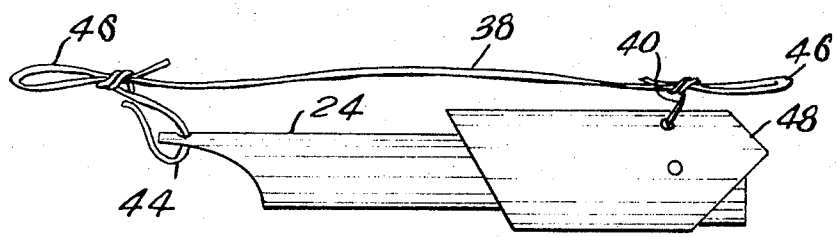
FIG_6

LUMINESCENT FISHING LURE

BACKGROUND AND SUMMARY OF THE INVENTION

Night fishing with lights attracts many fish which are indifferent to customary lures or bait. This is particularly true when fishing for squid which are unusually susceptible to the attraction of lights. To more effectively attract fish and the like to bait or an artificial lure, it is desirable that the light source be immersible in waer. In this manner, the light source can be placed on a line as closely as desired to the bait or artificial lure. A chemiluminescent wand has been found to comprise an ideal device for an immersible light source.

During certain chemical reactions, there is produced a light emission termed a chemiluminescence. The situations in which a chemiluminescent light is more desirable than other forms of illumination is apparent since chemiluminescent reactions generate illumination without producing high temperatures or electrical potentials hazardous to combustible environments.

Furthermore, the chemiluminescent reaction can be wholly contained within a hermetically sealed container. In the present situation, where it is desired that the light source be immersible, this feature is of prime importance. An appropriate functional container for reactant chemiluminescent chemicals is disclosed by Heinz K. W. Voight et al. in U.S. Pat. No. 3,576,987 issued May 4, 1971. In this patent is described a luminous wand having a flexible outer casing containing a frangible or breakable inner tube. Reactive chemiluminescent chemicals are separated and contained within the inner tube and between the inner tube and outer casing. When the inner tube is broken by bending the outer casing, the chemicals mix and luminescence is produced. These containers can be imporved by lining the outer flexible casing with a thin, impervious material such as glass to protect the fluid confined between the inner tube and outer casing. Experience has shown that a flexible casing without an impervious liner is subject to migration of moisture through the flexible casing when stored in environments where moisture is generally a problem. The adulterating effect of moisture causes a loss in effective illumination in the wand when activated. The shelf-life of a chemiluminescent wand can be substantially increased by the use of the impervious liner. Generally, the impervious material is also flangible. Therefore, when a wand is constructed with a frangible liner, it too will break when the outer tube is deformed for the purpose of breaking the inner tube for activating the wand. However, for definitional purposes, the outer casing will be deemed a flexible casing. It is to be understood that this term will also include a flexible tube with a flangible liner.

When used for a fishing lure, the chemiluminescent wand is attached to the fishing line and activated by bending the wand thereby fracturing the inner, frangible tube and allowing the chemicals to mix. It has been discovered, however, that in order to optimize the attracting effect of the illuminated lure, the degree of illumination should be controlled. In order to control the illumination, an opaque sleeve is inserted over the outer casing of the chemiluminescent wand. By cutting away portions of the sleeve, the desired length of the chemiluminescent wand can be exposed. Alternately, the chemiluminescent wand can be inserted in the sleeve in a telescoping manner. In this latter embodiment, the wand can be withdrawn from the sleeve exposing the selected length of the wand desired. This adjustment process in either of the embodiments can be periodically repeated as the luminosity of the activated wand decreases during the time of its useful life.

BRIEF DESCRIPTION OF THE DRAWINGS

FIG. 1 is a perspective view of the lure including the opaque tubular sheath and chemiluminescent wand attached to a steel leader connected to a fishing line.

FIG. 2 is a front elevational view of the lure and steel leader.

FIG. 3 is a side elevational view of the lure, partially fragmented, and partially in section, taken on the lines 3—3 in FIG. 2.

FIG. 4 is a side elevational view, partially in section, of an alternate embodiment of the lure including an opaque tubular sheath and chemiluminescent wand.

FIG. 5 is a side elevational view, partially in section, of the lure of FIG. 4 including the wand telescoped with respect to the sheath.

FIG. 6 is an alternate embodiment of the lure including a stylized sheath and chemiluminescent wand.

DETAILED DESCRIPTION OF THE PREFERRED EMBODIMENT

Referring to the perspective view of FIG. 1, lure 2 comprises a chemiluminescent wand 4 partially encased by an opaque tubular sheath 6. The wand 4 includes an outer flexible casing 8 and an inner enclosed frangible tube 10, shown in phantom in FIG. 2, which is encompassed by the outer casing. A first reactant chemical is encased in the inner enclosed tube 10 and a second reactant chemical is encased between the outer casing 8 and the tube 10. To prevent moisture from contaminating the second chemical, the outer casing may be lined with a thin impervious liner. When the outer casing 8 is deformed by bending, the inner frangible tube 10 fractures and allows the two chemicals, which are selected for their chemiluminescent properties during reaction, to mix generating the chemiluminescence. The fractured inner tube 10 is shown in the fragmentary view of FIG. 3.

The lure 2 is shown attached to a flexible leader 12. The flexible leader 12 is preferably of steel and has a first loop 14 at one end connected to a line 16 and a second loop 18 at its other end connected to a leader or line 20 attachable to a hook, artificial lure or other means for catching fish. The opaque sheath 6 encompasses a portion of the chemiluminescent wand 4 and blocks the effective luminosity of the encompassed portion of the wand. The opaque sheath 6 is fabricated from a tubular material that can easily be cut by a thick fishing knife. In this manner, the luminosity of the wand can be controlled by paring or cutting away the end 6a of the opaque sheath.

The lure 2 and steel leader 12 are shown detached from the line 16 and line or leader 20 in FIG. 2. At one end of the steel leader 12, the tubular sheath 6 is shown attached to the leader by a loop 26 which loops through two holes 28 for both securing the sheath 6 to the leader 12 and retaining the wand 4 in the sheath. As shown in the side elevational view of FIG. 3 in which the sheath is shown in section, the wand is shown to have a fixed end cap 30 of larger diameter than the remaining portion of the wand. In this manner, as the loop 26 encompasses a portion of the circumference of the wand 4, the cap is frictionally restrained by the loop thereby preventing the wand from slipping out of the sheath. However, the wand can be withdrawn from the sheath when a wire clip 32 at the opposite end of the leader is disconnected from a hole 34 in the distal end of the wand thereby permitting the wand to be displaced in the sleeve such that the cap 30 can be grasped and the wand withdrawn. In this manner, if the opaque sheath has been cut to an optimum length for the effective life of the wand, the sheath can be reused and the wand replaced.

The alternate embodiments of the lure 2 shown in FIGS. 4 and 5 allow the eight projected into the surrounding environment to be controlled by telescoping the wand 24 in an opaque tubular sheath 36. To maintain the position of the wand 24 in the sheath 36, the inner diameter of the sheath must be equal to or less than the outer diameter of the cap 30 on the wand. In this manner, the snug fit will insure that the wand will remain in the adjusted position in the sheath. The lure 36 is attached to a leader 38 by a clip 40 at one end of the leader which clips through a hole 42 in the sheath, and a wire clip 44 at the other end of the leader which clips through a hole 34 at the distal end of the chemiluminescent wand 24. Again, the leader 38 includes loops 46 at each end for connection to a leader or a line.

In FIG. 5, the lure 2 shown in FIG. 4 and described above is illustrated in its fully extended position. In this position, the lure provides maximum light since a major portion of the chemiluminescent wand 4 is exposed. The wand shown in FIGS. 4 and 5 is particularly useful where it is desired that the luminosity of the wand be controlled over the effective life of the wand. Since the wand, once activated, diminishes in luminosity over its effective life, which for most practical purposes is somewhat in excess of one hour, the luminosity can be adjusted periodically to more closely achieve a constant optimum luminosity.

The modified embodiment shown in FIG. 6 is included to illustrate a stylized sheath 48 of a design that may be more aesthetically pleasing than the cylindrical sheaths of FIGS. 1–5. The example shown in FIG. 6 is structurally similar to the embodiment in FIG. 1 but may also be modified for incorporation on the telescoping arrangement of FIGS. 4 and 5.

In all embodiments, the sheath may be constructed from a flexible plastic material which is opaque and easily cut for the embodiment of FIG. 1 or somewhat flexible in order to firmly fit over the cap of the wand in the embodiment of FIGS. 4 and 5. From the above description, it is apparent that additional modifications may be made to the lures described without departing from the scope of the invention.

I claim:

1. An illuminated fishing lure attachable to a fishing line for attracting fish, squid and other aquatic life comprising:
    a chemiluminescent wand having a first chemical in an inner frangible tube and a second chemical in an outer flexible casing encompassing the inner tube, wherein the chemicals when mixed, by deforming the outer casing and fracturing the inner tube, generate a chemiluminescence;
    an adjustable, opaque, tubular sheath slidably mounted on the wand and encompassing a portion of the chemiluminescent wand for controlling the effective luminosity of the wand; and
    means for attaching the wand and sheath to a fishing line.

2. The fishing lure as described in claim 1 wherein the tubular sheath is fabricated of a material which is easily cut, wherein the portion of the chemiluminescent wand encompassed by the sheath is adjustable by cutting away portions of the sheath.

3. An illuminated fishing lure attachable to a fishing line for attracting fish, squid and other aquatic life comprising:
    a chemiluminescent wand having a first chemical in an inner frangible tube and a second chemical in an outer flexible casing encompassing the inner tube, wherein the chemicals when mixed, by deforming the outer casing and fracturing the inner tube, generate a chemiluminescence;
    an adjustable, opaque, tubular sheath slidably mounted on the wand and encompassing a portion of the chemiluminescent wand for controlling the effective luminosity of the wand, the tubular sheath being fabricated of a material which is easily cut, wherein the portion of the chemiluminescent wand encompassed by the sheath is adjustable by cutting away portions of the sheath, and wherein the wand has a fixed cap of diameter greater than the diameter of the remaining wand at one end, and means for attaching the wand and sheath to a fishing line including a flexible leader having a loop at one end which loops through a pair of holes adjacent one end of the sheath and restrains the wand at the cap; the leader having a clip at its opposite end which engages a hole at the other end of the wand.

4. The fishing lure as described in claim 1 wherein the tubular sheath is adjustable with respect to the chemiluminescent wand by telescoping the wand within the sheath.

5. An illuminated fishing lure attachable to a fishing line for attracting fish, squid and other aquatic life comprising:
    a chemiluminescent wand having a first chemical in an inner frangible tube and a second chemical in an outer flexible casing encompassing the inner tube, wherein said chemicals when mixed, by deforming the outer casing and fracturing the inner tube, generate a chemiluminescence;
    an adjustable, opaque, tubular sheath slidably mounted on the wand and encompassing a portion of the chemiluminescent wand, the tubular sheath being adjustable with respect to the chemiluminescent wand by telescoping the wand within the sheath for controlling the effective luminosity of the wand; and;
    means for attaching the wand and sheath to a fishing line including a flexible leader having a clip at one end which clips to a hole at one end of the sheath and a clip at the other end which clips to a hole at one end of the wand.

6. The fishing lure as described in claim 1 wherein the wand has a portion of enlarged diameter greater than the diameter of the remaining wand at one end, the means for attaching the wand and sheath to a fishing line comprises a flexible leader having a loop at one end which loops through a pair of holes adjacent one end of the sheath and restrains the wand at the portion of enlarged diameter; the leader having a clip at its opposite end which engages a hole at the other end of the wand.

7. An illuminated fishing lure attachable to a fishing line comprising:
- an elongated source of light having opposite ends;
- an adjustable, opaque, hollow sheath slidably mounted on the light source and encompassing a portion of it for controlling its effective luminosity and;
- means for attaching the light source and sheath to a fishing line including a flexible leader having first attachment means at one end which attaches to one end of the sheath and second attachment means at the other end which attaches to one end of the light source, at least one of the first and second attachment means being removably attachable.

8. An illuminated fishing lure as recited in claim 7 wherein the light source is a chemiluminescent wand.

* * * * *